United States Patent
Calley et al.

(10) Patent No.: US 6,703,718 B2
(45) Date of Patent: Mar. 9, 2004

(54) WIND TURBINE CONTROLLER

(76) Inventors: David Gregory Calley, 10220 Ciervo Trail, Flagstaff, AZ (US) 86004; Harrison Marden Knowler, 207 N. Shoshone, Flagstaff, AZ (US) 86001

( * ) Notice: Subject to any disclaimer, the term of this patent is extended or adjusted under 35 U.S.C. 154(b) by 0 days.

(21) Appl. No.: 09/975,240

(22) Filed: Oct. 12, 2001

(65) Prior Publication Data
US 2003/0071467 A1 Apr. 17, 2003

(51) Int. Cl.$^7$ ............................................. H02P 9/00
(52) U.S. Cl. ........................ 290/44; 290/40 R; 322/29; 322/35; 323/207
(58) Field of Search ..................... 290/44, 40 R; 322/29, 35; 323/223, 207

(56) References Cited

U.S. PATENT DOCUMENTS

| | | | | |
|---|---|---|---|---|
| 1,142,538 A | | 6/1915 | Snee et al. ............... 290/4 R |
| 2,152,576 A | | 3/1939 | Weeks .................... 290/44 |
| 4,427,897 A | * | 1/1984 | Migliori .................. 290/44 |
| 4,435,646 A | * | 3/1984 | Coleman et al. ........... 290/44 |
| 4,498,017 A | * | 2/1985 | Parkins ................... 290/44 |
| 4,651,017 A | | 3/1987 | Longrigg ................. 290/44 |
| 4,695,736 A | | 9/1987 | Doman et al. ............. 290/44 |
| 4,825,139 A | * | 4/1989 | Hamelin et al. ........... 322/90 |
| 4,908,565 A | * | 3/1990 | Cook et al. .............. 290/4 R |
| 5,083,039 A | * | 1/1992 | Richardson et al. ........ 290/44 |
| 5,172,310 A | | 12/1992 | Deam et al. .............. 360/144 |
| 5,187,427 A | | 2/1993 | Erdman ................... 323/207 |
| 5,225,712 A | | 7/1993 | Erdman ................... 290/4 |
| 5,289,041 A | | 2/1994 | Holley ................... 290/44 |
| 5,566,061 A | | 10/1996 | Uchino ................... 366/71 |
| 5,579,217 A | | 11/1996 | Deam et al. .............. 363/144 |
| 5,652,485 A | | 7/1997 | Spiegel et al. ............ 318/147 |
| 5,663,631 A | * | 9/1997 | Kajiura et al. ............ 322/29 |
| 5,793,625 A | | 8/1998 | Balogh ................... 363/82 |
| 5,798,631 A | | 8/1998 | Spee et al. ............... 322/29 |
| 5,798,632 A | | 8/1998 | Muljadi .................. 322/29 |
| 5,907,192 A | | 5/1999 | Lyons et al. .............. 290/44 |
| 5,946,202 A | | 8/1999 | Balogh ................... 363/26 |
| 6,072,302 A | | 6/2000 | Underwood et al. ......... 322/17 |
| 6,137,187 A | | 10/2000 | Mikhail et al. ............ 290/44 |
| 6,144,190 A | | 11/2000 | Scott et al. .............. 322/15 |
| 6,175,217 B1 | * | 1/2001 | Da Ponte et al. .......... 322/19 |
| 6,181,111 B1 | | 1/2001 | Hoffman et al. ........... 322/28 |
| 6,239,996 B1 | * | 5/2001 | Perreault et al. .......... 323/223 |
| 6,275,012 B1 | | 8/2001 | Jabaji ................... 322/22 |
| 6,285,090 B1 | * | 9/2001 | Brutsaert et al. .......... 290/55 |
| 6,353,307 B1 | * | 3/2002 | Koelle et al. ............. 322/377 |
| 6,359,421 B1 | * | 3/2002 | Mueller et al. ............ 322/20 |

FOREIGN PATENT DOCUMENTS

DE 19817412 A1 * 10/1999 ............. H02P/9/14

* cited by examiner

*Primary Examiner*—Joseph Waks
(74) *Attorney, Agent, or Firm*—John Vanden Bosche

(57) ABSTRACT

A wind turbine with a permanent magnet alternator that uses a boost mode controller to improve performance at low and high wind speeds. The boost mode controller also allows the permanent magnet alternator to be slowed so that the wind turbine can be stall controlled. A rectifier bridge circuit includes a power electronic switching device on each phase to selectively short the voltage on that phase. The duty cycle of the switching devices is controlled to give the desired wind turbine performance. The switching frequency of the power electronic switches is continuously modulated at low wind speeds in order to minimize tonal acoustic emissions.

The controller simplifies the design of the wind turbine by accomplishing the necessary control functions without adding additional complexity to the wind turbine. This improves the cost-effectiveness of the wind turbine. The improvement in cost-effectiveness allows the wind turbine to be economically utilized at a location with a lower wind speed than previous wind turbine designs allowed.

13 Claims, 6 Drawing Sheets

WIND TURBINE CONTROLLER

FIELD OF THE INVENTION

The invention relates to the field of wind turbine generators. Specifically, the invention relates to a controller for permanent magnet, direct current wind turbines.

BACKGROUND OF THE INVENTION

Wind turbines have gained widespread use for electricity generation in recent years and a growing market is small-scale turbines for battery charging or residential use. Small-scale wind turbines typically utilize a permanent magnet alternator to convert rotational power in the turbine's rotor into useful electrical power. Permanent magnet alternators have many advantages that cause them to be well suited for use in a wind turbine. Their simplicity, durability, and efficiency are excellent for wind turbine applications.

Permanent magnet alternators, however, also have several weaknesses that must be overcome when designing a wind turbine generator. The first problem is that the alternator tends to lock into a preferred tooth-magnet position and a relatively high wind gust may be needed to initiate rotation of the alternator. Another problem with permanent magnet alternators is that their power output increases linearly with rotational speed whereas, for a wind turbine to maintain optimum aerodynamic efficiency, the alternator's power should increase with the cube of the rotational speed. Designing a wind turbine to operate at maximum efficiency at a design wind speed with sub-optimum efficiency at all other wind speeds typically gets around this problem. The next problem is that when an alternator is directly coupled to a wind turbine rotor, its output is at a low voltage unless a large number of turns of very fine wire are used in constructing the windings. Using such fine wire results in high electrical resistance and low efficiency.

A permanent magnet alternator typically includes three sets of windings in the stator and the output of the alternator is three phase power with varying voltage and frequency. In order to use the output power for battery charging or other useful purposes, the output is typically rectified to direct current. The rectificiation is most commonly achieved with a diode bridge as shown in FIG. 3. The circuit shown in FIG. 3 will provide a direct current output, but the voltage still varies. A voltage regulating controller is typically utilized for battery charging and other applications.

The prior art uses of permanent magnet alternators do not allow for aerodynamic stall of the wind turbine blades. This is because the speed of the rotor continues to increase as long as the wind speed increases. To achieve power regulation with a permanent alternator wind turbine, it is typical to provide a tail vane that furls the rotor out of the wind, or to design some other power limiting scheme built into the mechanical and aerodynamic design of the wind turbine. However, it would be desirable to have a permanent alternator that could provide increasing torque loads above a certain speed or power level in order to slow the wind turbine's rotor and induce aerodynamic stall.

Another problem with typical prior art uses of permanent alternators for wind turbines is that the output voltage was relatively low. If a user wishes to invert the output power for use in an alternating current application, it is necessary to first boost the output voltage to a high voltage before putting the power through the inverter. The voltage boost is typically built into the inverter and increases the cost and complexity of the inverter. It would therefore be desirable to have a permanent magnet alternator with high voltage direct current output so that an inverter without voltage boost could be utilized.

SUMMARY OF THE INVENTION

The present invention solves the problems of the prior art wind turbines by utilizing a novel power electronic controller. The controller uses a power electronics bridge to provide power control and active rectification. The controller uses boost mode techniques to control the alternator. The boost mode allows optimized performance in low winds and provides for aerodynamic stall in high winds.

The controller consists of a rectifier that utilizes a switching device, such as an FET or an IGBT, on each phase along with at least one diode on each phase. The switching devices short the phases together for a short period of time to allow energy storage within the internal inductance of the alternator. When the switches reopen, the energy stored in the alternator's inductance is released and the output voltage is temporarily boosted. This technique is commonly employed with external inductors used for energy storage. The present invention utilizes the internal inductance of the alternator, rather than an external inductor, to achieve boost mode.

The controller can be used to regulate the voltage of the alternator's output so that a separate voltage regulator is not required. If the wind turbine is connected to a battery bank, the controller can monitor the batteries' voltage and regulate the alternator's output voltage appropriately to achieve efficient battery charging. If the alternator is used with an inverter in an AC application, then the controller can be used to raise the output voltage of the alternator so that the boost portion of the inverter is not required. This simplifies the design of the inverter and improves the economics of grid-connected wind energy conversion.

One advantage of utilizing boost mode in a wind turbine with a permanent magnet alternator is that it improves the wind turbine's performance in low winds. The controller monitors the turbine's rotor speed and, when a sufficient speed is reached to allow generation, the switches on all of the phases are momentarily shorted to cause an inductive voltage spike in the alternator's windings that causes current to begin flowing. The boost mode also raises the output voltage of the alternator to a level that is useful for battery charging even when the rotor is turning at slow speeds.

The boost mode controller can create an audible acoustic noise at the switching frequency of the FETs or IGBTs. The noise is created by abrupt changes in current in the alternator's stator windings. When the boost mode controller is activated at low wind speeds to enhance the low wind operating characteristics of the wind turbine, its acoustic noise can stand out above the aerodynamic noise created by the wind turbine. The noise can be particularly noticeable if it is at a constant frequency because the noise is tonal whereas aerodynamic noise is atonal. In order to overcome this issue, the switching frequency of the FETs or IGBTs is constantly varied. Varying the switching frequency causes the noise from the alternator to be atonal and makes it much less noticeable.

At high wind speeds, the boost mode controller can be used to increase the reaction torque in the alternator. This allows the wind turbine's rotor to be slowed in high winds, thereby inducing aerodynamic stall. In this manner, a permanent magnet alternator can be used in a wind turbine that has variable speed operation and power control by aerodynamic stall.

BRIEF DESCRIPTION OF THE DRAWINGS

Other features and advantages of the invention will be apparent from the following Detailed Description taken in conjunction with the accompanying drawings, in which.

DETAILED DESCRIPTION OF THE INVENTION

Figure 1:
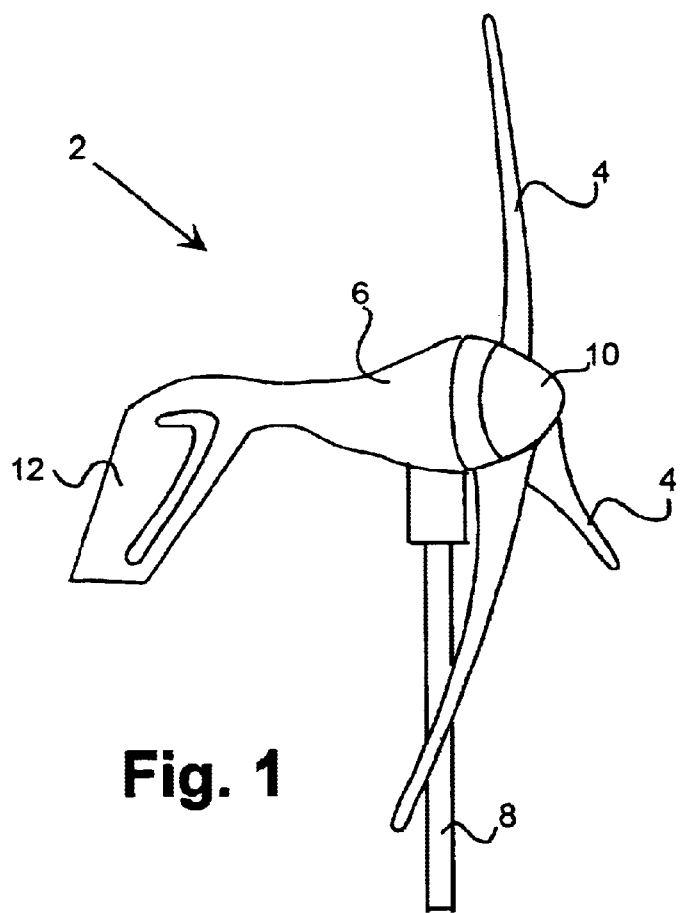
FIG. 1 is a wind turbine according to the present invention.

FIG. 1 shows a wind turbine 2 with three blades 4, a nacelle 6, and a tower 8. While the wind turbine 2 is shown with three blades 4, the present invention can work on a wind turbine with any number of blades or even on a vertical axis wind turbine. The wind turbine 2 shown in FIG. 1 is a relatively small turbine suitable for battery charging or for providing residential power. However, the present invention can be used on any size wind turbine.

The blades 4 are mounted on a hub 10 for rotation therewith. The pitch angle of the blades 4 relative to the hub 10 is contemplated as being fixed, although the invention can work equally well with variable pitch blades. The hub 10 is mounted on the nacelle 6 for rotation thereon. The hub 10 may be attached to the nacelle 6 using bearings, bushings, or other suitable attachment. The nacelle 6 is attached to the tower 8 by a yaw bearing that allows the nacelle 6 to rotate about a vertical axis to align the wind turbine with the wind direction. The nacelle 6 is rotated on the tower 8 using a tail vane 12. While the present invention contemplates using a tail vane 12, it would work equally well on a wind turbine that uses an active yaw drive to align the nacelle 6 with the wind direction or on a wind turbine that uses a downwind rotor configuration to orient the nacelle 6 with the wind.

Figure 2:
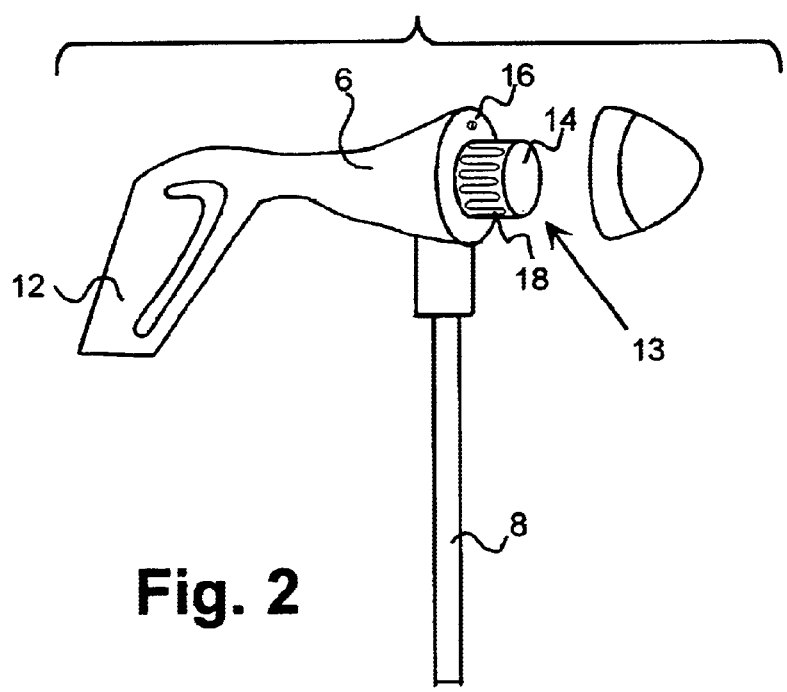
FIG. 2 is an exploded view of a wind turbine according to the present invention.

FIG. 2 shows an exploded view of the wind turbine 2. The wind turbine 2 generates power with an alternator 13. The alternator 13 consists of a stator and a rotor. The stator 14 is shown in FIG. 2 as part of the nacelle 6. A rotor is part of the hub 10. The rotor provides a magnetic field and may include permanent magnets or electromagnets. The use of permanent magnets simplifies the design substantially and is preferred, especially for use in small scale wind turbines for battery charging and residential power. The stator 14 includes one or more windings of electrical wire. When the magnetic field from the rotor is rotated relative to the stator 14, then current is induced in the windings of the stator 14. Most commonly, the stator 14 includes three windings and produces three phase power. However, the present invention can work with any number of windings in the stator 14.

The nacelle 6 also includes a speed sensor 16 for sensing the rotational speed of the hub 10. The speed sensor 16 can be an optical sensor, a hall effect sensor, or any other suitable sensor. The speed sensor 16 provides data input to the controller of the present invention. Instead of providing a physical sensor 16 for measuring the rotor speed, it would be possible to measure the frequency of electrical output from one or more of the phases of the alternator.

Figure 3:
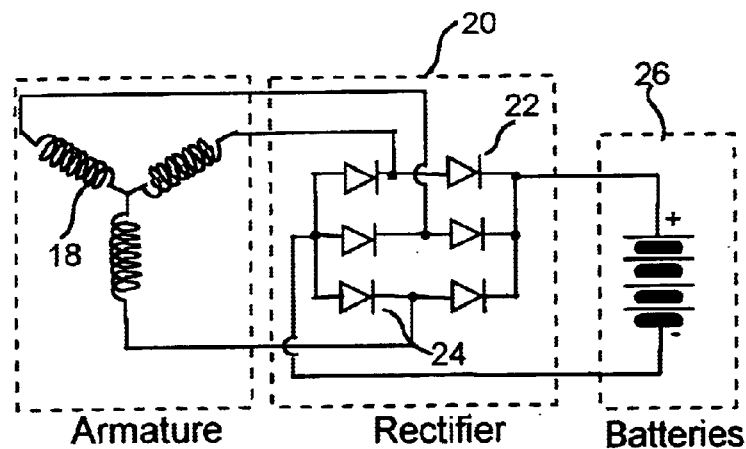
FIG. 3 is a rectifier circuit according to the prior art.

The alternator 13 provides an alternating current output voltage and current that must be rectified to direct current for battery charging. A prior art rectifier is shown in FIG. 3. The armature 14 can have any number of windings 18, but three windings is the most common configuration as shown in FIG. 3. The output of the windings 18 of the armature 14 are input into a rectifier 20. The rectifier 20 consists of six diodes 22 and 24. Three of the diodes 22 provide a positive DC output and three of the diodes 24 provide a negative DC output. The DC output is used to charge batteries 26. In the prior art rectifier, the frequency and voltage of the AC output from the armature 14 vary with the rotational speed of the alternator. While the varying frequency is rectified to DC voltage and current, the DC output voltage is still subject to fluctuations as the rotor speed varies. If the rotational speed of the alternator is too low, then the output voltage will be too low to be useful. This limits the usefulness of the prior art rectifier. Another problem is that the power factor of the output of the prior art rectifier bridge 20 is less than unity. Furthermore, the output of the rectifier bridge 20 has significant ripple and may not be suitable for some applications that require high quality power.

Figure 4:
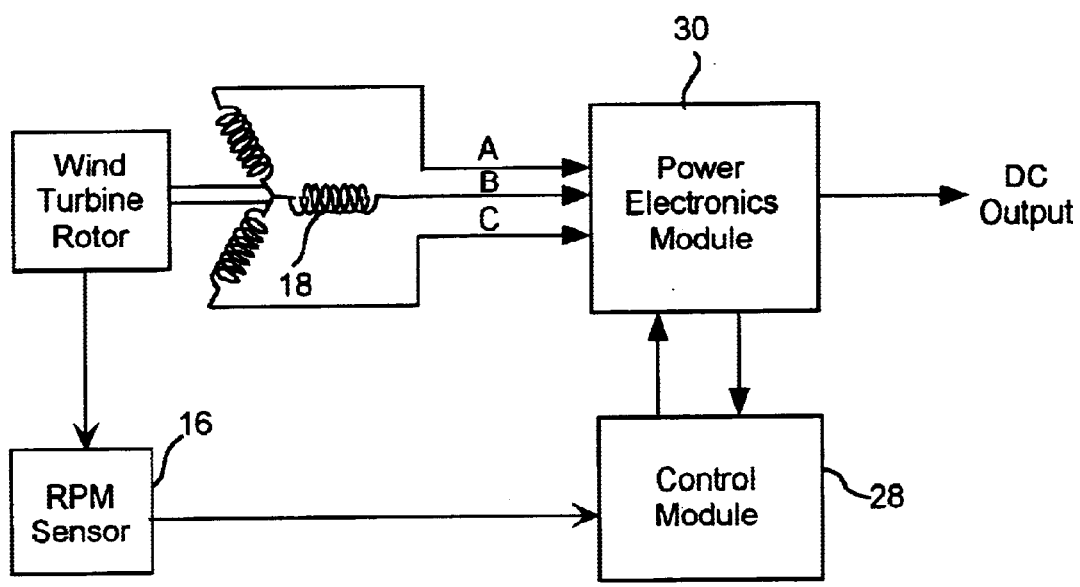
FIG. 4 is a block diagram of the wind turbine controller of the present invention.

FIG. 4 shows the controller of the present invention in schematic form. The armature 14 of the alternator 13 is shown as having three windings 18, although other numbers of phases could also be used. Each of the windings 18 has an inherent resistance and inductance associated with it. The output of the armature 14 is three phases of alternating current power with the phases labeled as A, B, and C. An RPM sensor 16 measures the rotational speed of the alternator 13 and provides that information to a control module 28. A power electronics module 30 receives the alternating current from the armature 14 and provides single phase direct current output. The power electronics module 30 includes a sensor for measuring various electrical properties, such as current and voltage, and provides that information to the control module 28. The control module 28 in turn provides information to the power electronics module 30 about switching frequency and duty cycle for the components in the power electronics module 30.

Figure 5:
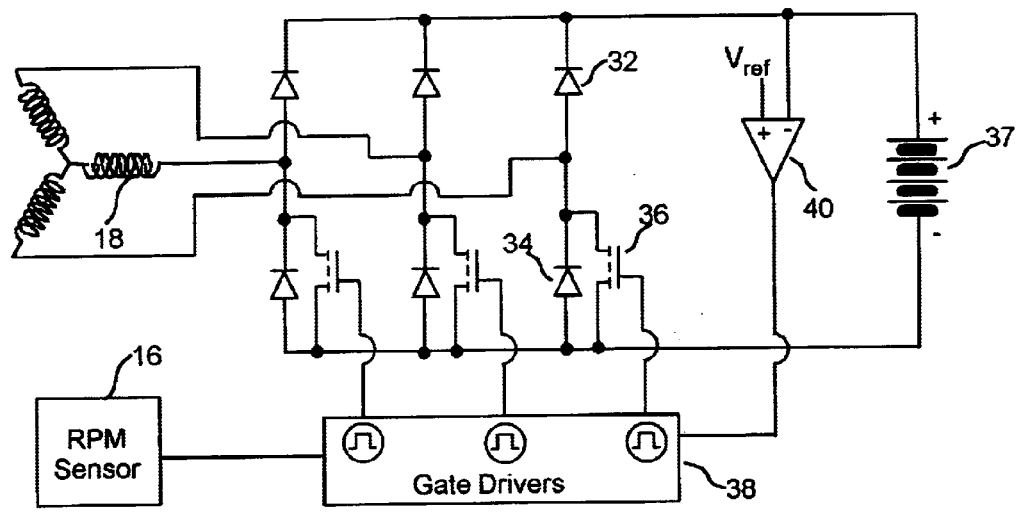
FIG. 5 is circuit diagram for the wind turbine controller according to a first embodiment of the present invention.

FIG. 5 shows the circuitry of the controller of the present invention. The circuitry of the controller is similar to the boost converter described in U.S. Pat. No. 5,793,625 to Balogh, the specification and drawings of which are incorporated herein by reference. The output of the windings 18 of the armature 14 are fed into a three phase bridge. The bridge has a positive side and a negative side. Each phase includes a diode 32 on the positive side of the bridge. On the negative side of the bridge, each phase includes a diode 34 and a switching device 36 in parallel. The switching devices 36 can be FETs, IGBTs, or similar switching devices. In the preferred embodiment, the switches 36 are FETs. The circuit could potentially be reversed so that the FETs 36 are on the positive side of the bridge in parallel with diodes 32. It would also be possible to eliminate the diodes 34 that are in parallel with the FETs 36. Another possible configuration would be to use six FETs, so that there is a set of switches on the positive side of the bridge and a set on the negative side. If six FETs are used, then it would be possible to eliminate diodes completely. The use of six FETs would provide an additional advantage that the output power could be actively rectified on both the positive and negative sides of the circuit. The output of the bridge is a DC voltage that is applied to a battery bank 37. The battery bank 37 can be connected to heaters, water pumps, appliances, or other devices that utilize electricity.

The FETs 36 are controlled to create an active rectifier. By momentarily shorting all three FETs 36 at the same time, the voltage builds up in the internal inductance of the alternator's windings 18 so that the alternator can be operated in a boost mode. Control of the FETs 36 is performed by a set of gate drivers 38. Gate drivers 38 receive input from a speed sensor 16 and from a voltage sensor 40. The voltage sensor 40 measures the DC output voltage from the bridge and compares it to a reference voltage. The voltage measurement is preferably performed during time periods when all of the FETs 36 are shorted so that the battery voltage is not masked. During the period when the FETs 36 are shorted for battery voltage sensing, the controller waits a short period of time to allow dynamic effects of capacitance and inductance in the circuit to settle out before the battery voltage is sensed. A capacitor could be added to the circuit on the DC side of the bridge in parallel with the battery bank in order to smooth transients in output, although the capacitor can tend to mask the charge state of the batteries 37.

Figure 6:
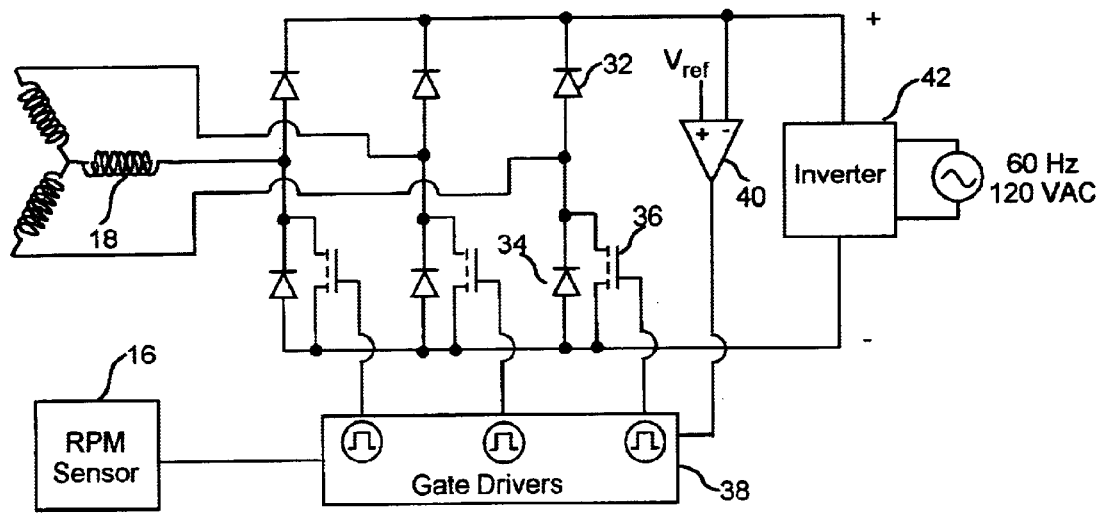
FIG. 6 is circuit diagram for the wind turbine controller according to a second embodiment of the present invention.

FIG. 6 shows a second preferred embodiment of the invention in which the battery bank 37 is replaced with an inverter 42. The inverter 42 provides AC output that can be used to power AC appliances or can be provided to the electricity grid. The inverter 42 utilized with this embodiment of the present invention differs from typical inverters in that it does not include a voltage boost function. A typical inverter must first boost the DC voltage before the power can be inverted into AC output. However, the controller of the present invention can provide DC power at any voltage required. It may potentially be even more advantageous to include a capacitor in the DC portion of the circuit before the inverter in order to provide smooth, steady DC power to the inverter.

Figure 7:
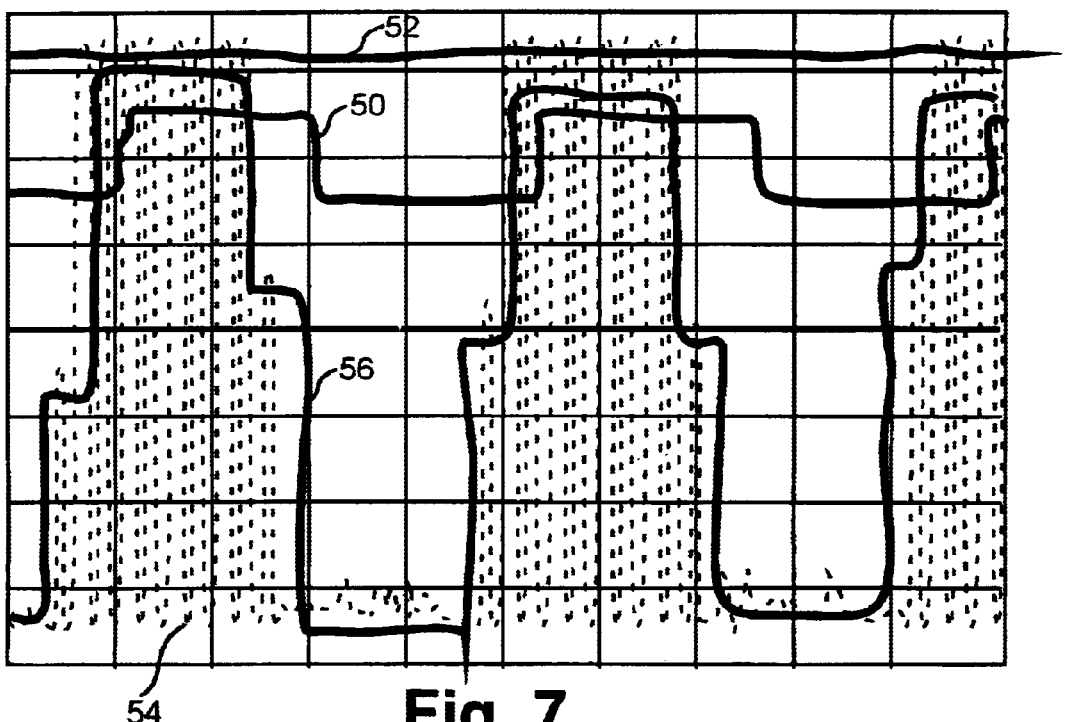
FIG. 7 shows the output voltage, current, and power from the wind turbine controller of the present invention.

FIG. 7 shows a typical output of the controller for Phase A of the alternator when boost mode is activated. In this figure, the curve labeled 50 is a square wave at the synchronous speed or the alternator's rotor. 52 is the output voltage from the controller. Note that the output 52 is relatively smooth and does not include the ripple that is typically associated with a conventional prior art rectifier. Curve 54 is the Phase A voltage which is varying at the switching frequency of the FET connected to Phase A. The Phase A voltage is approximately a square wave at the FET's switching frequency modulated by a square wave at the synchronous frequency of the alternator. Curve 56 is the current in Phase A. Note that the current and voltage in Phase A are very closely aligned, thereby resulting in a very high power factor.

Figure 8:
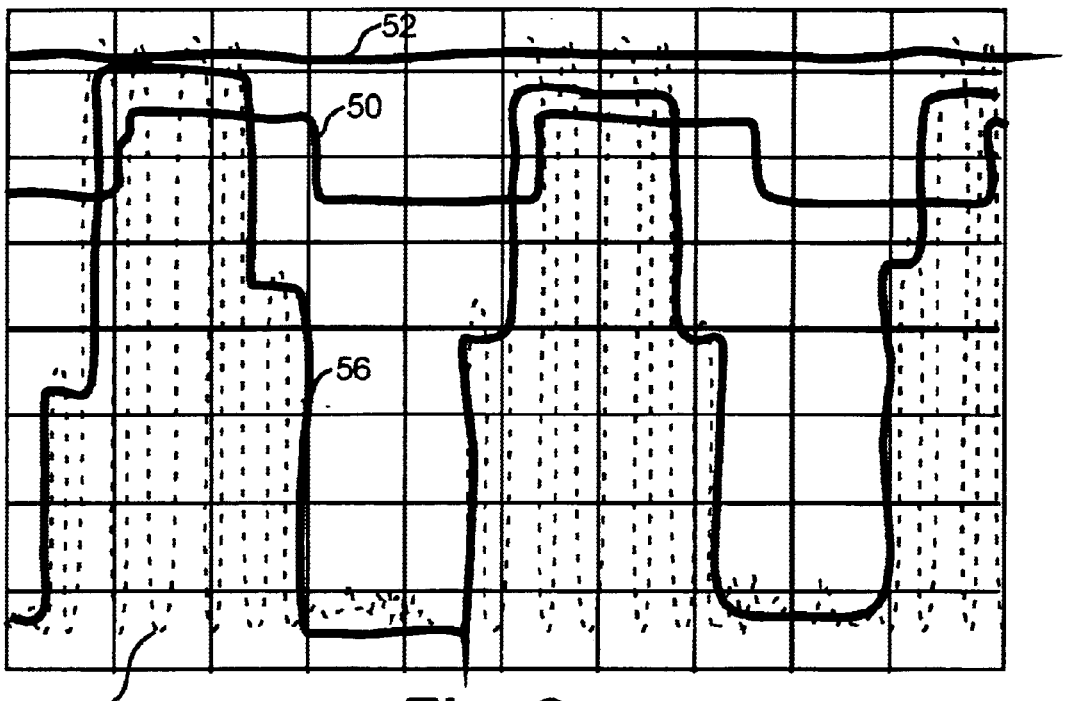
FIG. 8 shows the output voltage, current, and power from the wind turbine controller of the present invention with a lower switching frequency compared to FIG. 7.

The windings of the alternator have been found to make an audible buzz at the FETs' switching frequency. At high winds, this is not important because there is enough aerodynamic noise to mask the buzzing. However, at low wind speeds, the aerodynamic noise is low and does not mask the buzzing in the windings. Noise is a subjective issue and the degree of annoyance that a noise creates in the person hearing the noise depends on the character of the noise. Tonal noises have been found to be particularly bothersome because they stand out relative to atonal white noise. The buzzing in the alternator's windings is a tonal noise that can be annoying to people who hear it. In order to minimize the effect of the noise, the switching frequency of the FETs is continually modified. In the preferred embodiment, the switching frequency is changed every 1.6 milliseconds. FIG. 8 shows the output of the controller and is similar in all respects except that the switching frequency of the FETs has been decreased. Note that the frequency of the square wave in curve 54 is at a lower frequency compared to FIG. 7.

The gate drivers 38 control the switching of the FETs 36 to achieve the desired output characteristics and to optimize performance of the wind turbine 2. The primary variable that the gate drivers control is the duty cycle of the FETs. A higher duty cycle results in increased voltage boost. Higher duty cycle can also create a higher torque load on the alternator. The duty cycle is determined based upon an operating strategy that is defined based on the wind turbine design including the rotor size, the blade design, alternator characteristics, and controller characteristics. The operating strategy should take into account at least the speed of the wind turbine's rotor and the battery voltage (or line voltage in the case of a grid connected wind turbine with an inverter).

Figure 9:
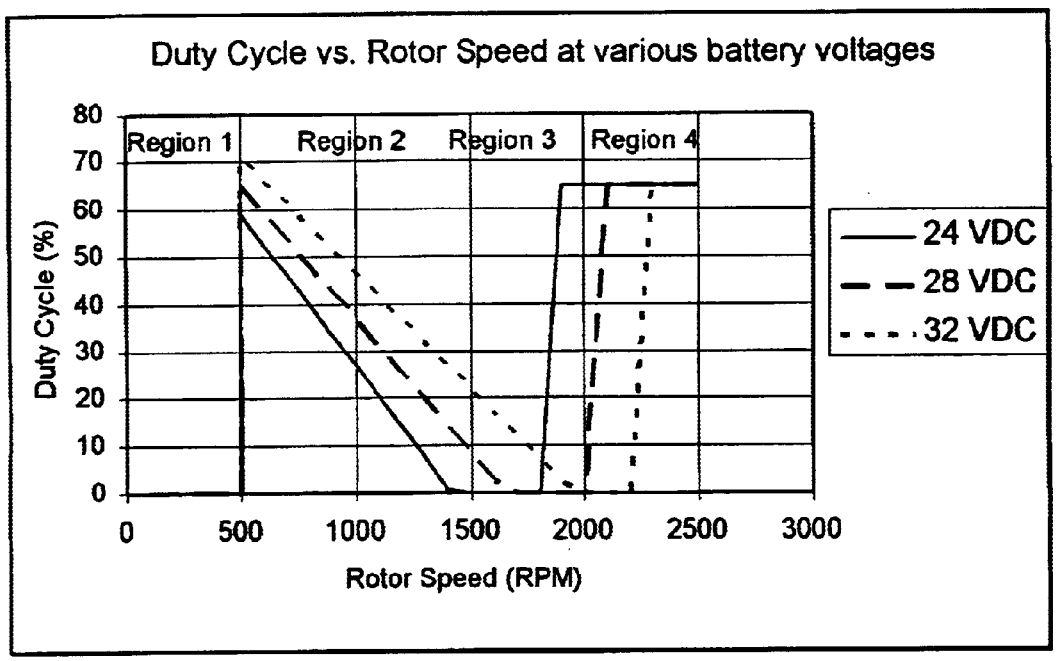
FIG. 9 shows an operating map of duty cycle versus rotor speed for the wind turbine controller of the present invention.

The preferred operating strategy has four operating regions which relate to various states of the wind turbine and the controller as shown in FIG. 9. The four operating regions are referred to herein as Region 1, Region 2, Region 3, and Region 4. Region 1 occurs when the wind is too low for generation and the wind turbine has not yet started producing power. Region 2 occurs when the wind turbine has begun producing power and the controller is in boost mode. Region 3 occurs when the wind turbine is producing power but the controller is not in boost mode. Region 4 occurs when the wind speed is higher than the rated wind speed and the controller puts the wind turbine into stall mode.

Region 1 is when the wind is too low for power production. The range of Region 1 varies depending on the details of the wind turbine design. For the preferred embodiment, Region 1 occurs when the wind turbine rotor is below approximately 500 RPM. This corresponds to a wind speed below approximately 7 mph. When the wind turbine is in Region 1, the controller is not in boost mode and the duty cycle of the FETs is 0%.

Region 2 is when the wind turbine has begun producing power and boost mode is employed to achieve the desired output voltage and to improve the wind turbine's starting characteristics. In Region 2, the duty cycle is defined by the following equation:

$$DC = (C1*V + C2)*RPM + C3*V + C4 \qquad \text{Equation 1}$$

where DC represents the duty cycle expressed as a percentage, V is the battery voltage as measured by the voltage sensor, RPM is the rotational speed of the wind turbine as sensed by the RPM sensor, and C1, C2, C3, and C4 are constants. The constants C1, C2, C3, and C4 should be calculated for the specific wind turbine design to provide optimized output. In the preferred embodiment, the values of the constants are 0.0019, −0.11, 0.55, and 78 respectively. These values were determined empirically by trial and error using various values of the constants at a given wind speed until the output of the wind turbine was maximized. When the wind turbine is operating in Region 2, the duty cycle is continually calculated using Equation 1. If the duty cycle is higher than a predetermined maximum duty cycle, then the duty cycle is simply set equal to the maximum value. The duty cycle varies from approximately 65% to 0% within Region 2 which extends from a rotor speed of approximately 500 RPM to an upper speed range that depends on battery voltage.

Region 3 is defined at its lower end by the point at which the duty cycle reaches 0% using the equation for Region 2.

At its upper end, Region 3 is defined by the beginning of Region 4. The RPM range of Region 3 depends on the battery voltage. Within Region 3, the duty cycle of the FETs is 0%. Regions 2 and 3 together cover a wind speed range of approximately 10 mph to 40 mph.

Region 4 is above rated wind speed and, within this region, the controller applies a higher load on the alternator in order to increase the torque on the alternator to slow it. As the alternator slows, the blades enter aerodynamic stall and the power output from the wind turbine is reduced. Within Region 4, the duty cycle of the FETs is set to 65%. The controller continuously monitors the wind turbine's rotor speed and the battery bank's voltage level to determine when to enter Region 4. The equation that is used to determine when to enter Region 4 is:

$$RPM - C5 * V > C6 \quad \text{Equation 2}$$

If the result of Equation 2 is true, then the controller increases the duty cycle to 65% to slow the rotor and induce aerodynamic stall. The constants $C5$ and $C6$ must be calculated for a particular wind turbine configuration. In the preferred embodiment, the value of $C5$ is 43 and the value of $C6$ is 840 so that the turbine enters stall at 1872 RPM for a nominal battery voltage of 24 V. The speed at which the turbine enters stall is dependent upon the charge state of the batteries so that it always enters stall at a constant power level. A given rotor speed can correspond to varying power output levels depending on the charge level of the batteries. If a battery voltage other than 24 V is used, the values of $C5$ and $C6$ would have to be adjusted accordingly. For example, if a 48 V battery system were used, then the value of $C5$ would be 21.5 instead of 43. The value of $C5$ would also be different if the size or design of the wind turbine's blades is changed.

When the controller enters Region 4, a 15 second delay is implemented before the controller can switch to another operating region. This provides some time for the increased duty cycle to increase the alternator's reaction torque and slow the wind turbine's rotor before the operating parameters can be changed again. After the 15 second delay, the controller remains in Region 4 until the following equation is satisfied:

$$RPM - C7 * V < C8 \quad \text{Equation 3}$$

If the result of the Equation 3 is true, then the controller returns to Region 3 and the duty cycle is set to 0%. The constants $C7$ and $C8$ must be calculated for a particular wind turbine configuration. In the preferred embodiment, the value of $C7$ is 21 and the value of $C8$ is $-1$ so that the turbine exits stall mode at 503 RPM for a nominal battery voltage of 24 V. The rotor speed, and corresponding power output, for exiting Region 4 are lower than the speed and power output at which the controller entered Region 4 so that there is some hysteresis. The equilibrium rotor speed with a duty cycle of 65% remains somewhere between 503 RPM and 750 RPM as long as the wind is above rated wind speed. The rotor will not slow down to a speed less than 503 RPM as long as the wind remains high. Therefore, the wind turbine will operate stably in a stalled condition at a reduced rotor speed and power output level as long as the wind speed remains above the rated wind speed.

The dependence on voltage in Equations 2 and 3 ensure that the wind turbine enters and exits Region 4 at a consistent power output level and that the power level for Region 4 does not change with battery voltage. If the wind turbine is connected to an inverter and the output power is fed into a utility grid, then the DC voltage would be constant and would be regulated by the grid voltage of the AC utility system. In that case, the value of V in Equations 2 and 3 would be a constant value based on the AC grid voltage. In that case, the dependence on voltage would disappear from Equations 2 and 3 and the criteria for entering and exiting Region 4 would only depend on the wind turbine's rotor speed.

Figure 10:
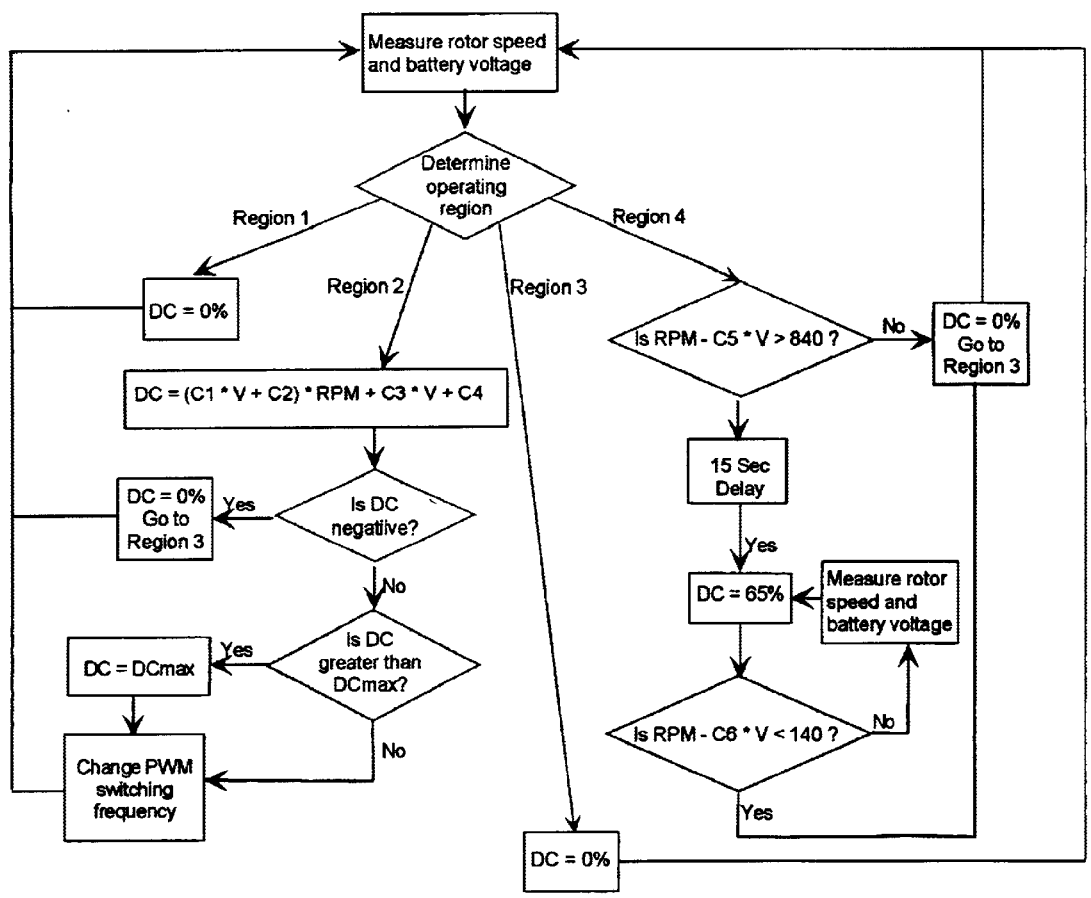
FIG. 10 is a flow chart for the control strategy used in the preferred embodiment of the wind turbine controller of the present invention.

FIG. 10 shows a flow chart outlining the control algorithm for the controller of the present invention. At each control cycle, the controller measures the rotor speed and the battery voltage and determines the appropriate operating region based upon that information. If the wind turbine is in Region 1, then the duty cycle is set to 0% and the controller returns to begin the next control cycle. If the wind turbine is in Region 2, then the duty cycle is calculated based on Equation 1. If the duty cycle is negative, or if it is greater than a predetermined maximum duty cycle, then the duty cycle is either set to 0% or the maximum value. While the controller is in Region 2, the pulse width modulation switching frequency of the FETs is constantly adjusted to avoid acoustic noise. After adjusting the switching frequency, the controller returns to begin the next control cycle. If the wind turbine is Region 3, the duty cycle is set to 0% and the controller returns to begin the next control cycle. If the wind turbine is in Region 4, then the duty cycle is set to 65% and a 15 second delay is initiated. After the 15 second delay, the controller enters into a loop that monitors the rotor speed and battery voltage. The duty cycle is maintained at 65% until the wind speed drops and the rotor speed drops below the value prescribed in Equation 3.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

What is claimed is:

1. A wind turbine comprising:
   a rotor with at least one blade;
   an permanent magnet alternator with a rotating portion attached to said rotor for rotation therewith and an armature that generates alternating current electricity when said rotating portion turns, wherein said armature has an internal inductance;
   a rectifier for converting said AC electricity from said armature into a DC voltage;
   a power circuit operatively coupled to said rectifier for selectively shorting the AC voltage from said armature so as to store electrical energy within said internal inductance of said armature; and
   an inverter for converting said DC voltage to AC voltage suitable for connection to a utility grid wherein said power circuit boosts said DC voltage to a level sufficient to allow said inverter to operate without a boost function within said inverter.

2. The wind turbine of claim 1 further comprising a controller that senses the rotational speed of said rotor and adjusts the duty cycle of said power circuit based upon said rotational speed.

3. The wind turbine of claim 2 further comprising a battery electrically connected to said rectifier.

4. The wind turbine of claim 3 wherein said controller momentarily shorts the AC voltage from said armature thereby causing an inductive voltage spike in said internal inductance of said armature sufficient to cause current to flow into said battery when said rotational speed is at a lower end of the range of generating speeds.

5. The wind turbine of claim 3 wherein said controller senses the charge in said battery and adjusts the duty cycle of said power circuit based upon said rotational speed and said battery charge.

6. The wind turbine of claim 1 wherein said power circuit has a selectable duty cycle, and wherein said wind turbine further comprises a controller that senses the rotational speed of said blade and increases the duty cycle of said power circuit when said rotational speed reaches a predetermined level, thereby causing said blade to enter a condition of aerodynamic stall.

7. The wind turbine of claim 1 wherein said power circuit has a switching frequency and said switching frequency is modulated in order to minimize tonal acoustic noise emission.

8. A wind turbine comprising:
  a blade;
  a permanent magnet alternator operatively connected to said blade wherein said alternator generates electricity when said blade rotates;
  a controller for operating said alternator at variable speed and for controlling the power output from said wind turbine by aerodynamic stall.

9. The wind turbine of claim 8 wherein said controller senses the rotational speed of said blade and slows said alternator when said blade turns at a predetermined speed in order to causes said blade to enter a state of aerodynamic stall.

10. The wind turbine of claim 8 wherein said alternator comprises a rotating portion attached to said blade for rotation therewith and an armature that generates alternating current electricity when said rotating portion turns, wherein said armature has an internal inductance;
  a rectifier for converting said AC electricity from said armature into a DC voltage; and
  a power circuit operatively coupled to said rectifier for selectively shorting the AC voltage from said armature so as to store electrical energy within said internal inductance of said armature.

11. The wind turbine of claim 10 wherein said controller selects a duty cycle for said power circuit that causes said wind turbine to operate at variable speed and that controls the power output from said wind turbine by aerodynamic stall.

12. The wind turbine of claim 11 wherein said controller senses the rotational speed of said blade and increases the duty cycle of said power circuit when said rotational speed reaches a predetermined level, thereby causing said blade to enter a condition of aerodynamic stall.

13. A wind turbine comprising:
  a rotor with at least one blade;
  a permanent magnet alternator with a rotating portion attached to said rotor for rotation therewith and an armature that generates alternating current electricity when said rotating portion turns, wherein said armature has an internal inductance;
  a rectifier for converting said AC electricity from said armature into a DC voltage;
  a power circuit with a selectable duty cycle operatively coupled to said rectifier for selectively shorting the AC voltage from said armature so as to store electrical energy within said internal inductance of said armature; and
  a controller that senses the rotational speed of said blade and increases the duty cycle of said power circuit when said rotational speed reaches a predetermined level, thereby causing said blade to enter a condition of aerodynamic stall.

\* \* \* \* \*